(12) United States Patent
Pawlak et al.

(10) Patent No.: US 12,001,056 B2
(45) Date of Patent: Jun. 4, 2024

(54) LIGHT COUPLING BETWEEN STACKED PHOTONICS CHIPS

(71) Applicant: GlobalFoundries U.S. Inc., Malta, NY (US)

(72) Inventors: Bartlomiej Jan Pawlak, Leuven (BE); Michal Rakowski, Ballston Lake, NY (US); Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 64 days.

(21) Appl. No.: 17/834,375

(22) Filed: Jun. 7, 2022

(65) Prior Publication Data
US 2023/0393339 A1 Dec. 7, 2023

(51) Int. Cl.
*G02B 6/293* (2006.01)
*G02B 6/42* (2006.01)

(52) U.S. Cl.
CPC ......... *G02B 6/2934* (2013.01); *G02B 6/4215* (2013.01)

(58) Field of Classification Search
None
See application file for complete search history.

(56) References Cited

U.S. PATENT DOCUMENTS

| | | |
|---|---|---|
| 10,197,730 B1 | 2/2019 | Ngu et al. |
| 10,690,845 B1 | 6/2020 | Jacob et al. |
| 2006/0088266 A1 | 4/2006 | Blauvelt et al. |
| 2017/0017039 A1* | 1/2017 | Tu ..................... G02B 6/12002 |

FOREIGN PATENT DOCUMENTS

CN 111610650 A 9/2020

OTHER PUBLICATIONS

Miguel Cabezón, Ignacio Garcés, Asier Villafranca, José Pozo, Pragati Kumar, and Andrzej Kaźmierczak, "Silicon-On-Insulator Chip-to-chip Coupling via Vertical Grating Couplers," Appl. Optics 51, 2 pages (2012).

Jin Yao et al.; "Grating-coupler based low-loss optical interlayer coupling," DOI:10.1109/GROUP4.2011.6053824; 8th IEEE International Conference on Group IV Photonics; pp. 383-385 (Nov. 1, 2011).

(Continued)

*Primary Examiner* — Chad H Smith
(74) *Attorney, Agent, or Firm* — Thompson Hine LLP; Anthony Canale (57) ABSTRACT

Structures including stacked photonics chips and methods of fabricating a structure including stacked photonics chips. The structure comprises a first chip including a first waveguide core, a ring resonator adjacent to a portion of the first waveguide core, and a first dielectric layer over the first waveguide core and the ring resonator. The first dielectric layer has a first surface. The structure further comprises a second chip including a second waveguide core and a second dielectric layer over the second waveguide core. The (Continued)

second dielectric layer has a second surface adjacent to the first surface of the first dielectric layer, and the second waveguide core is positioned adjacent to the ring resonator.

20 Claims, 7 Drawing Sheets

(56) References Cited

OTHER PUBLICATIONS

Blaicher, M., Billah, M.R., Kemal, J. et al. "Hybrid multi-chip assembly of optical communication engines by in situ 3D nano-lithography." Light Sci Appl 9, 71. https://doi.org/10.1038/s41377-020-0272-5 (2020).
Ke Wang, Ampalavanapillai Nirmalathas, Christina Lim, Efstratios Skafidas, and Kamal Alameh, "High-speed free-space based reconfigurable card-to-card optical interconnects with broadcast capability," Optics Express 21, 15395-15400 (2013).
Jonathan T. Bessette and Donghwan Ahn, "Vertically stacked microring waveguides for coupling between multiple photonic planes," Optics Express 21, 13580-13591 (2013).
Siyuan Yu, "Potentials and challenges of using orbital angular momentum communications in optical interconnects," Optics Express 23, 3075-3087 (2015).
A. Louri and Hongki Sung, "3D optical interconnects for high-speed interchip and interboard communications," in Computer, vol. 27, No. 10, pp. 27-37, doi: 10.1109/2.318581 (Oct. 1994).
T. Spuesens et al., "Compact Integration of Optical Sources and Detectors on SOI for Optical Interconnects Fabricated in a 200 mm CMOS Pilot Line," in Journal of Lightwave Technology, vol. 30, No. 11, pp. 1764-1770, doi: 10.1109/JLT.2012.2189871 (Jun. 1, 2012).
M. S. Parekh, P. A. Thadesar and M. S. Bakir, "Electrical, optical and fluidic through-silicon vias for silicon interposer applications," 2011 IEEE 61st Electronic Components and Technology Conference (ECTC), pp. 1992-1998, doi: 10.1109/ECTC.2011.5898790 (2011).
Okamoto, Hiroyuki et al., "Characteristics of an Optical Filter Composed of Two Vertically Coupled Microring Resonators." IEICE Transactions. 90-C. 1324-1328. 10.1093/ietele/e90-c.6.1324. (2007).
European Patent Office, Extended European Search Report and Written Opinion issued in European Patent Application No. 22201113.2 dated Jun. 2, 2023 (11 pages).

* cited by examiner

LIGHT COUPLING BETWEEN STACKED PHOTONICS CHIPS

BACKGROUND

The disclosure relates to photonics chips and, more specifically, to structures including stacked photonics chips and methods of fabricating a structure including stacked photonics chips.

Photonics chips are used in many applications and systems including, but not limited to, data communication systems and data computation systems. A photonics chip integrates optical components and electronic components into a unified platform. Factors such as layout area, cost, and operational overhead may be reduced by the integration of both types of components on the same chip. However, the space on a photonics chip for the placement of optical and electronic components is limited.

Improved structures including stacked photonics chips and methods of fabricating a structure including stacked photonics chips are needed.

SUMMARY

In an embodiment of the invention, a structure comprises a first chip including a first waveguide core, a ring resonator adjacent to a portion of the first waveguide core, and a first dielectric layer over the first waveguide core and the ring resonator. The first dielectric layer has a first surface. The structure further comprises a second chip including a second waveguide core and a second dielectric layer over the second waveguide core. The second dielectric layer has a second surface adjacent to the first surface of the first dielectric layer, and the second waveguide core is positioned adjacent to the ring resonator.

In an embodiment of the invention, a structure comprises a first chip including a first waveguide core and a first dielectric layer over the first waveguide core. The first dielectric layer has a first surface. The structure further comprises a second chip including a second waveguide core with a tapered section and a second dielectric layer over the second waveguide core. The second dielectric layer has a second surface adjacent to the first surface of the first dielectric layer. The tapered section of the second waveguide core is positioned adjacent to a portion of the first waveguide core.

In an embodiment of the invention, a method comprises forming a first chip including a first waveguide core, a ring resonator adjacent to a portion of the first waveguide core, and a first dielectric layer over the first waveguide core and the ring resonator. The method further comprises forming a second chip including a second waveguide core and a second dielectric layer over the second waveguide core, and bonding a first surface of the first dielectric layer to a second surface of the second dielectric layer such that the second waveguide core is positioned adjacent to the ring resonator.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
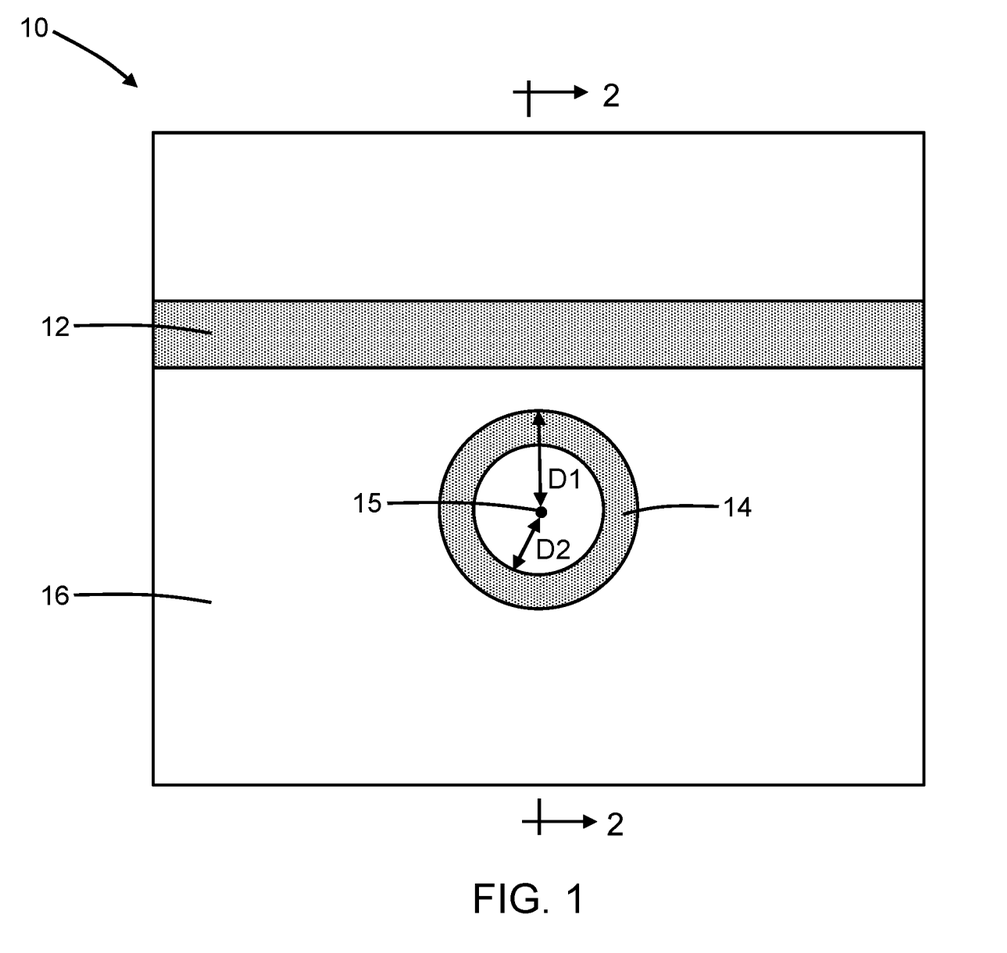
FIG. 1 is a top view of a structure at an initial fabrication stage of a processing method in accordance with embodiments of the invention.
Figure 2:
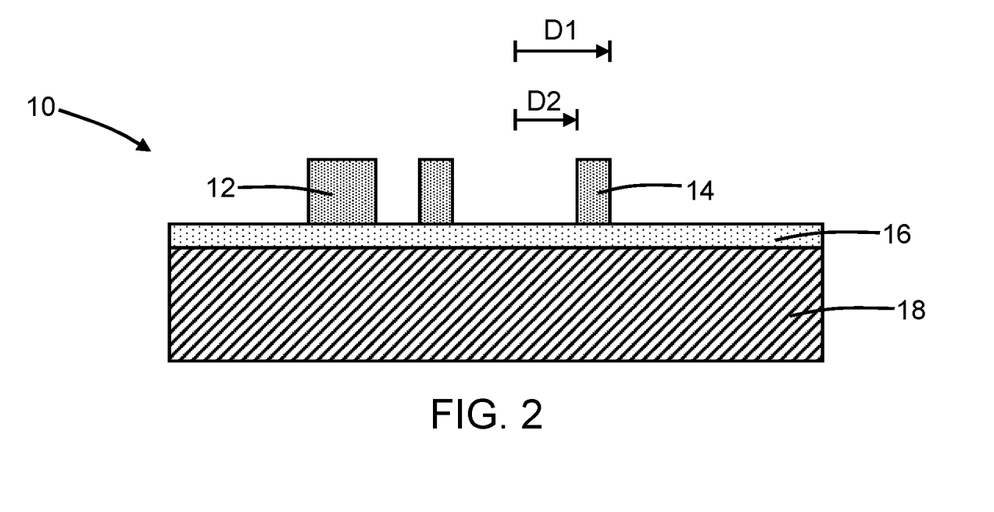
FIG. 2 is a cross-sectional view of the structure taken generally along line 2-2 in FIG. 1.

With reference to FIGS. 1, 2 and in accordance with embodiments of the invention, a chip 10 includes a waveguide core 12 and a ring resonator 14 positioned adjacent to a portion of the waveguide core 12. In an embodiment, the ring resonator 14 may be positioned adjacent to the waveguide core 12 with a gap separating the ring resonator 14 from the portion of the waveguide core 12. In an embodiment, the ring resonator 14 may be a closed loop or ring having the waveguide core 12 as either an input bus or an output bus. In an embodiment, the ring resonator 14 may be an annular waveguide core bounded by concentric inner and outer ring-shaped edges that are centered on a center point 15. In an embodiment, the ring resonator 14 may have a uniform width between the inner ring-shaped edge and outer ring-shaped edge. In an embodiment, the ring resonator 14 may be spaced in a lateral direction from the portion of the waveguide core 12. In an embodiment, the center point 15 of the ring resonator 14 may be spaced from the nearest sidewall of the waveguide core 12. The ring resonator 14 may have an outer diameter D1, which may be measured from the center point 15 to the outer ring-shaped edge, ranging from 4 microns to 40 microns. The ring resonator 14 may have an inner diameter D2, which may be measured from the center point 15 to the inner ring-shaped edge, also ranging from 4 microns to 40 microns but less than the outer diameter D1.

The waveguide core 12 and ring resonator 14 may be positioned in a vertical direction over a dielectric layer 16 and a substrate 18. In an embodiment, the dielectric layer 16 may be comprised of a dielectric material, such as silicon dioxide, and the substrate 18 may be comprised of a semiconductor material, such as single-crystal silicon. In an embodiment, the dielectric layer 16 may be a buried oxide layer of a silicon-on-insulator substrate, and the dielectric layer 16 may separate the waveguide core 12 and ring resonator 14 from the substrate 18. In an embodiment, the waveguide core 12 and ring resonator 14 may be concurrently formed by patterning a single-crystal silicon device layer of a silicon-on-insulator substrate with lithography and etching processes.

In an alternative embodiment, the waveguide core 12 and ring resonator 14 may be comprised of a dielectric material, such as silicon nitride, that is deposited and patterned by lithography and etching processes. In alternative embodiments, the waveguide core 12 and ring resonator 14 may be comprised of a different dielectric material, such as silicon oxynitride. In alternative embodiments, the waveguide core 12 and ring resonator 14 may be comprised of a non-dielectric material, such as a III-V compound semiconductor material or a polymer.

Figure 3:
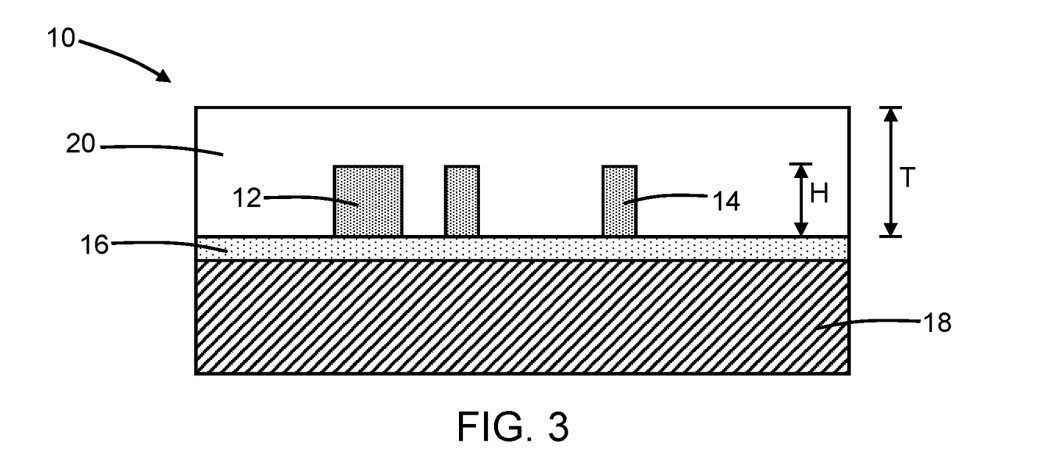
FIG. 3 is a cross-sectional view of the structure at a fabrication stage subsequent to FIG. 2.

With reference to FIG. 3 in which like reference numerals refer to like features in FIG. 2 and at a subsequent fabrication stage, a dielectric layer 20 is formed over the waveguide core 12 and ring resonator 14. The dielectric layer 20 may be comprised of a dielectric material, such as silicon dioxide, that is deposited and planarized. The dielectric material constituting the dielectric layer 20 may have a lower refractive index than the material constituting the waveguide core 12 and ring resonator 14. The waveguide core 12 and ring resonator 14 are embedded in the dielectric layer 20, which has a thickness T that is greater than the height H of the waveguide core 12 and ring resonator 14.

Figure 4:
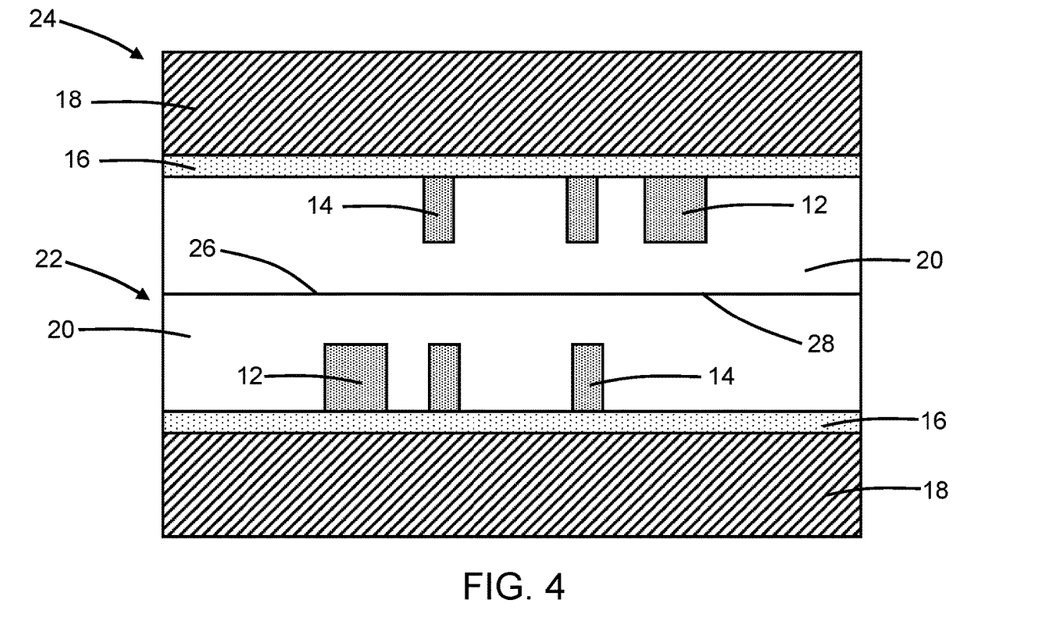
FIG. 4 is a cross-sectional view of the structure at a fabrication stage subsequent to FIG. 3.

With reference to FIG. 4 in which like reference numerals refer to like features in FIG. 3 and at a subsequent fabrication stage, a chip 22 representing an instance of the chip 10 and a chip 24 representing a different instance of the chip 10 may be bonded together in a face-to-face manner to provide a stacked arrangement. The dielectric layer 20 of the chip 22 may have a surface 26, and the dielectric layer 20 of the chip 24 may have a surface 28 that is placed in a contacting relationship with the surface 26 such that the surfaces 26, 28 are adjacent to each other when bonded. In an embodiment, the surface 26 may directly contact the surface 28.

The contacting surfaces 26, 28 may be bonded together by a bonding process. For example, after the surfaces 26, 28 are brought into the contacting relationship, a low temperature thermal treatment or anneal may be performed at a sufficient temperature (e.g., less than or equal to 400° C.) and for a sufficient duration to establish the face-to-face bond between the contacting surfaces 26, 28. The temperature of the thermal anneal may be reduced by a pretreatment, such as plasma or chemical activation, of the surfaces 26, 28. In an embodiment, the chips 22, 24 may be clamped together during the thermal anneal to provide compression assistance for the face-to-face bonding process. In an embodiment, the thermal anneal may be performed in a controlled atmosphere comprised of a non-oxidizing gas, such as nitrogen.

The ring resonator 14 on the chip 22 and the ring resonator 14 on the chip 24 are placed into proximity and aligned when the surfaces 26, 28 are bonded and therefore positioned adjacent to each other. The ring resonator 14 on the chip 22 is spaced in a vertical direction from the ring resonator 14 on the chip 24. The ring resonator 14 on the chip 22 has an overlapping relationship with the ring resonator 14 on the chip 24. In an embodiment, the ring resonator 14 on the chip 22 may be concentric with the ring resonator 14 on the chip 24 and have aligned center points 15. In an embodiment, the diameters D1, D2 of the ring resonator 14 on the chip 22 may be equal to the diameters D1, D2 of the ring resonator 14 on the chip 24. In an alternative embodiment, an additional dielectric layer may be formed on the dielectric layer 20 of the chip 22 and/or the dielectric layer 20 of the chip 24 and provide respective surfaces involved in the face-to-face bonding.

Dielectric material from the dielectric layer 20 of the chip 22 and the dielectric layer 20 of the chip 24 is positioned in a vertical direction between the waveguide core 12 and ring resonator 14 on the chip 22 and the waveguide core 12 and ring resonator 14 on the chip 24 due to the difference between the thickness T of the dielectric layer 20 and the height of the H of the waveguide core 12 and ring resonator 14. As a result, the ring resonators 14 on the different chips 22, 24 have a non-contacting relationship and are separately by a low-index dielectric material.

In use, light (e.g., laser light) may be coupled and transferred in a lateral direction from the waveguide core 12 on the chip 22 to the ring resonator 14 on the chip 24. The light may be subsequently coupled and transferred in a vertical direction from the ring resonator 14 on the chip 22 to the ring resonator 14 on the chip 24. The light may be subsequently coupled and transferred in a lateral direction from the ring resonator 14 on the chip 24 to the waveguide core 12 on the chip 24. The result is light transfer from the chip 22 to the chip 24.

The stacking of the chips 22, 24 may increase the capabilities beyond those of a single chip and may increase the available space for devices due to inter-chip light transfer. The respective ring resonators 14 define an optical link between the stacked chips 22, 24 that permits light transfer between the stacked chips 22, 24. The inter-chip light transfer may be achieved without the utilization of grating couplers, which are highly sensitive to misalignment.

Figure 5:
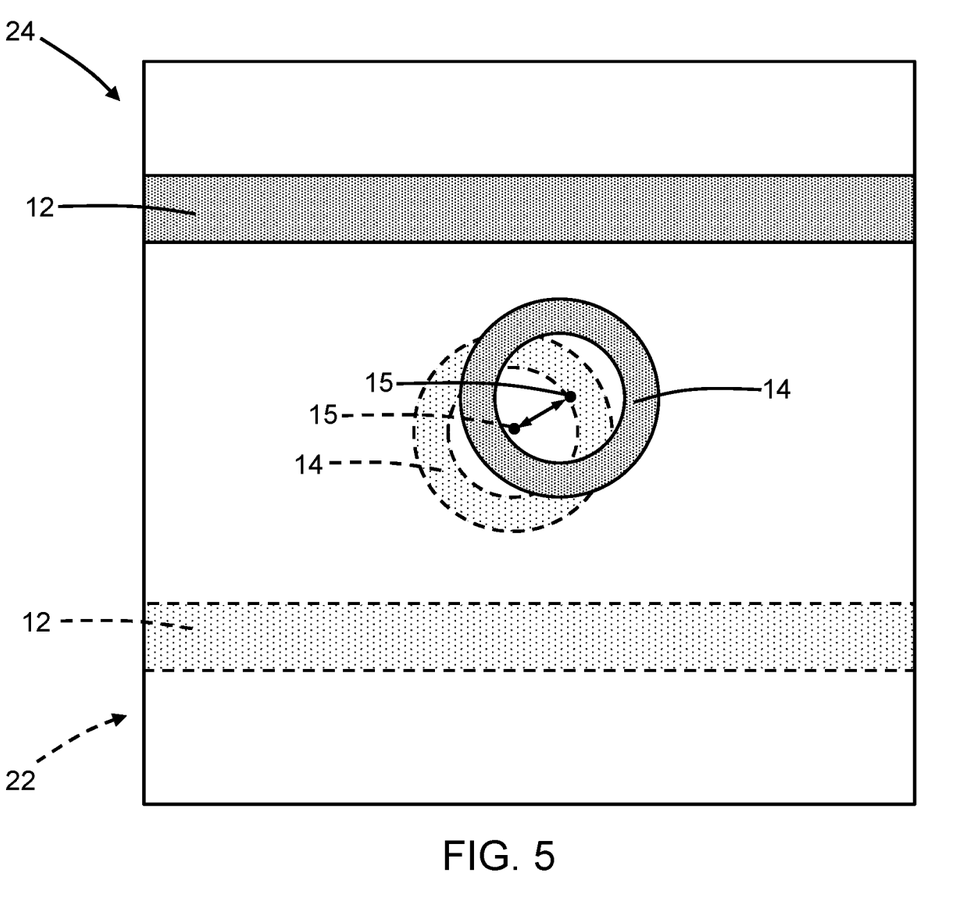
FIG. 5 is a top view illustrating stacked photonic chips with partially-overlapping ring resonators.

With reference to FIG. 5 and in accordance with alternative embodiments of the invention, the ring resonator 14 on the chip 22 may only partially overlap with the ring resonator 14 on the chip 24 because of bonding accuracy limitations that may result in a shift in the positions of the different ring resonators 14 relative to each other. As a result, the ring resonator 14 on the chip 22 may be nonconcentric with the ring resonator 14 on the chip 24 and their respective non-aligned center points 15 may exhibit an offset, as indicated by the double-headed arrow. For example, the bonding accuracy may be on the order of 0.5 microns. In the instance of partial overlap, the ring resonators 14 of the different chips 22, 24 may cross at a pair of locations that produce light transfer. The optical link provided by the ring resonators 14 has a low sensitivity to misalignment because of the efficient light coupling enabled between partially-overlapped ring resonators 14 on the different chips 22, 24.

Figure 6:
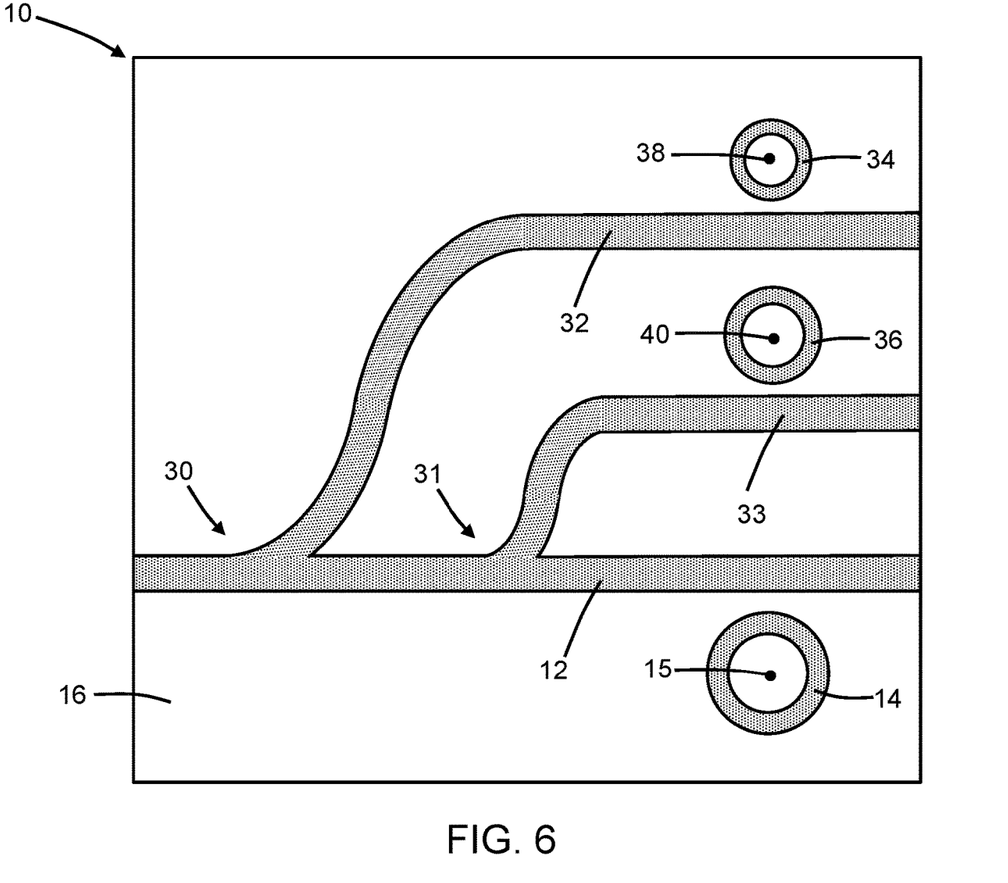
FIG. 6 is a top view of a structure in accordance with alternative embodiments of the invention.

With reference to FIG. 6 and in accordance with alternative embodiments of the invention, the instances of the chip 10 providing the chips 22, 24 that are face-to-face bonded may be modified to add waveguide cores 32, 33 similar to waveguide core 12, ring resonators 34, 36 similar to the ring resonator 14, a splitter 30 that couples the waveguide core 12 to the waveguide core 32, and a splitter 31 that couples the waveguide core 12 to the waveguide core 33. The splitter 30 is configured to divert a portion of the light propagating in the waveguide core 12 from the waveguide core 12 to waveguide core 32. The splitter 31 is configured to divert a portion of the light propagating in the waveguide core 12 from the waveguide core 12 to waveguide core 33. The waveguide core 12 may be physically and/or optically coupled by the splitter 30 to the waveguide core 32 and by the splitter 31 to the waveguide core 33.

The waveguide core 32 and the waveguide core 33 may each include a set of curved bends configured to provide respective lateral offsets in routing. The ring resonator 14 is positioned with a spaced relationship adjacent to a portion of the waveguide core 12, the ring resonator 34 is positioned with a spaced relationship adjacent to a portion of the waveguide core 32, and the ring resonator 36 is positioned with a spaced relationship adjacent to a portion of the waveguide core 33. The ring resonator 36 is spaced from the waveguide core 32 by a distance sufficient to prevent light transfer between the waveguide core 32 and the ring resonator 36.

In an embodiment, the ring resonator 36 may have an outer diameter relative to a center point 40 that is less than the outer diameter of the ring resonator 14, and the ring resonator 34 may have an outer diameter relative to a center point 38 that is less than the outer diameter of the ring resonator 36. As a result, the ring resonators 14, 34, 36 have different resonance frequencies and therefore are configured to transfer light of different frequencies between the chips 22, 24 at different locations of overlap. In an embodiment, the outer diameter of the ring resonator 14 on the chip 22 may be equal to the outer diameter of the ring resonator 14 on the chip 24, the outer diameter of the ring resonator 34 on the chip 22 may be equal to the outer diameter of the ring resonator 34 on the chip 24, and the outer diameter of the ring resonator 36 on the chip 22 may be equal to the outer diameter of the ring resonator 36 on the chip 24.

When the chips 22, 24 are face-to-face bonded, the ring resonator 14 on the chip 22 has an overlapping relationship with the ring resonator 14 on the chip 24, the ring resonator 34 of the chip 22 has an overlapping relationship with the ring resonator 34 of the chip 24, and the ring resonator 36 of the chip 22 has an overlapping relationship with the ring resonator 36 of the chip 24. In that regard, the ring resonator 14 of the chip 22 may be concentric or, alternatively, non-concentric with the ring resonator 14 of the chip 24 as respectively shown in FIG. 4 and FIG. 5, the ring resonator 34 of the chip 22 may also be concentric or, alternatively, non-concentric with the ring resonator 34 of the chip 24 in a manner similar to that respectively shown for the ring resonators 14 in FIG. 4 and FIG. 5, and the ring resonator 36 of the chip 22 may also be concentric or, alternatively, non-concentric with the ring resonator 36 of the chip 24 in a manner similar to that respectively shown for the ring resonators 14 in FIG. 4 and FIG. 5. The stacked chips 22, 24 may provide a data transfer platform that can include a single laser supplying light to the waveguide core 12 associated with, for example, chip 22. In an alternative embodiment, one or more additional sets of waveguide cores and ring resonators of different resonance frequencies may be added along with additional splitters.

Figure 7:
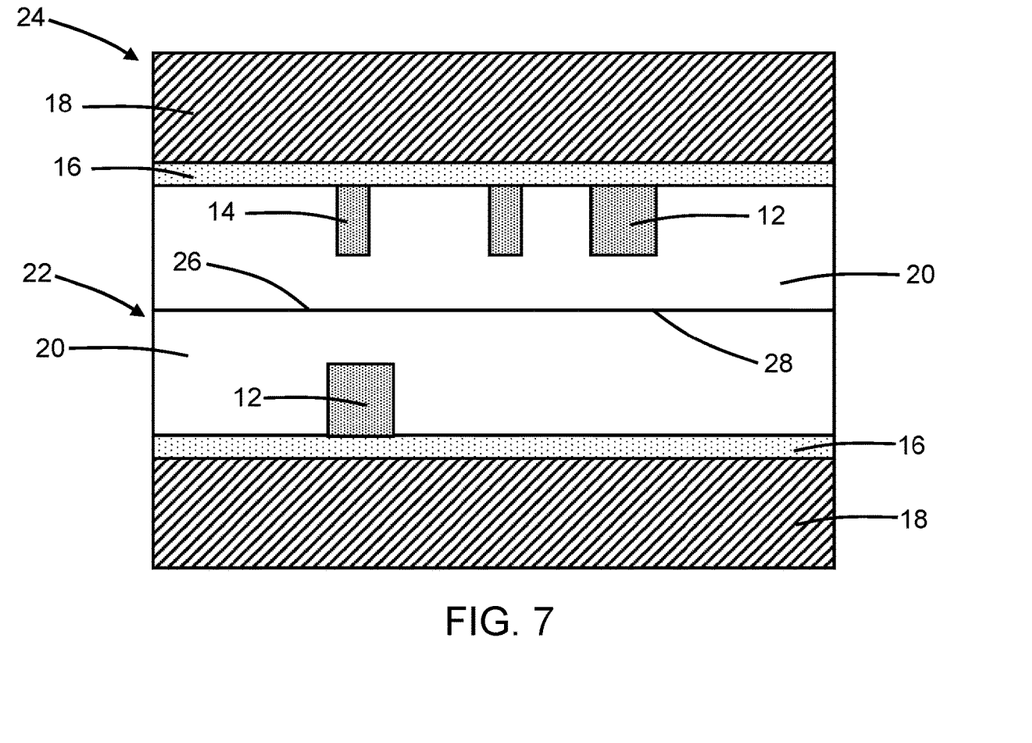
FIG. 7 is a cross-sectional view of a structure in accordance with alternative embodiments of the invention.

With reference to FIG. 7 and in accordance with alternative embodiments of the invention, one of the instances of the chip 10 providing the chips 22, 24 that are face-to-face bonded may be modified to omit the ring resonator 14. For example, the chip 22 may lack a ring resonator such that only the chip 24 includes a ring resonator 14. In an embodiment, the ring resonator 14 on the chip 24 may be positioned adjacent to a portion of the waveguide core 12 on the chip 24 in a lateral direction and adjacent to a portion of the waveguide core 12 on the chip 22 in a diagonal direction. When the instances of the chip 10 provided by the chips 22, 24 are face-to-face bonded, the ring resonator 14 of the chip 24 may transfer light laterally and vertically from the waveguide core 12 of the chip 24 to the waveguide core 12 of the chip 22.

Figure 8:
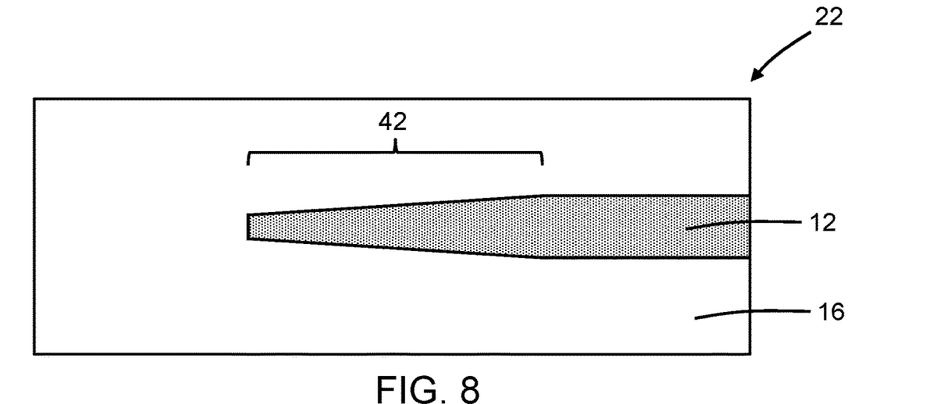
FIGS. 8, 8A, 8B are top views of structures in accordance with alternative embodiments of the invention.
Figure 8A:
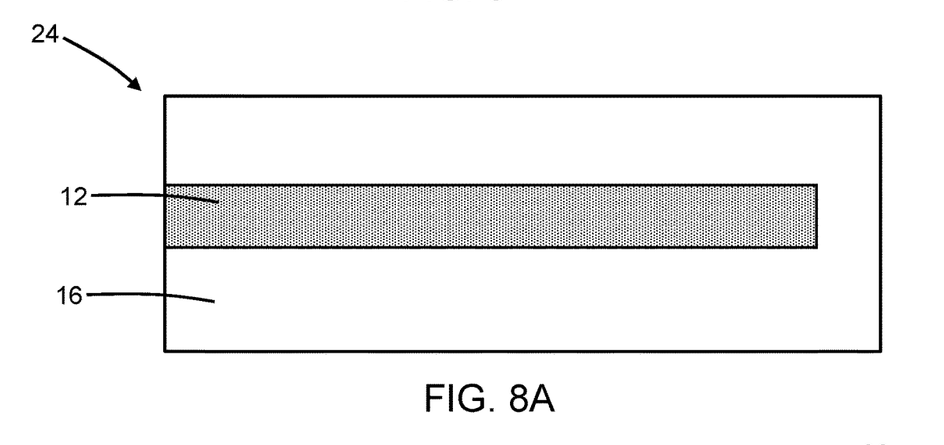
Figure 8B:
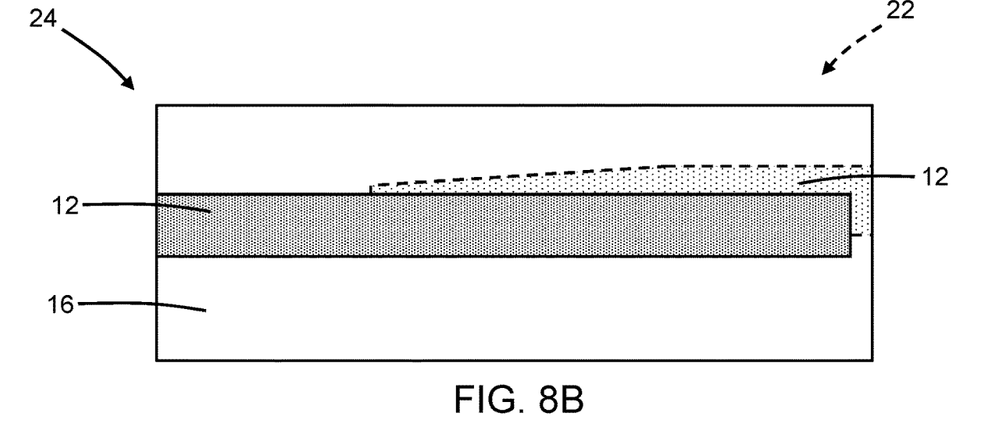

With reference to FIGS. 8, 8A, 8B and in accordance with alternative embodiments of the invention, the optical link between the chips 22, 24 may have a different type of construction. Specifically, the ring resonators 14 may be omitted from both chips 22, 24, and the waveguide core 12 on the chip 22 may be modified to add a tapered section 42 that terminates the waveguide core 12. When the chips 22, 24 are face-to-face bonded as shown in FIG. 8B, the tapered section 42 of the waveguide core 12 on the chip 22 is positioned adjacent to a portion of the waveguide core 12 on the chip 24. In particular, the portion of the waveguide core 12 on the chip 24 may partially overlap with the tapered section 42 of the waveguide core 12 on the chip 22 due to misalignment during face-to-face bonding. In an alternative embodiment, the portion of the waveguide core 12 on the chip 24 may fully overlap with the tapered section 42 of the waveguide core 12 on the chip 22. In an embodiment, the tapered section 42 may be an inverse taper characterized by a gradual increase in width along a mode propagation direction in the waveguide core 12 of the chip 22. In an embodiment, the overlapping portion of the waveguide core 12 on the chip 24 may have a constant width.

Light traveling in a mode propagation direction in the waveguide core 12 may couple in a vertical direction from the tapered section 42 of the waveguide core 12 on the chip 22 to the overlapping portion of the waveguide core 12 on the chip 24. The optical link including the tapered section 42 of the waveguide core 12 on the chip 22 has a low sensitivity to misalignment because of the efficient light coupling enabled even if the tapered section 42 of the waveguide core 12 on the chip 22 is only partially overlapped with the waveguide core 12 on the chip 24.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first chip including a first waveguide core, a first ring resonator adjacent to a portion of the first waveguide core, a first dielectric layer over the first waveguide core and the first ring resonator, a first semiconductor substrate, and a first buried oxide layer, the first semiconductor substrate separated from the first waveguide core and the first ring resonator by the first buried oxide layer, and the first dielectric layer having a first surface; and
   a second chip including a second waveguide core, a second dielectric layer over the second waveguide core, a second ring resonator in the second dielectric layer, a second semiconductor substrate, and a second buried oxide layer, the second semiconductor substrate separated from the second waveguide core and the second ring resonator by the second buried oxide layer, the second dielectric layer having a second surface bonded to the first surface of the first dielectric layer, and the second ring resonator positioned adjacent to a portion of the second waveguide core.

2. The structure of claim 1 wherein the first ring resonator is spaced in a lateral direction from the portion of the first waveguide core, and the second ring resonator is spaced in the lateral direction from a portion of the second waveguide core.

3. The structure of claim 2 wherein the first ring resonator is spaced in a vertical direction from the second ring resonator.

4. The structure of claim 1 wherein the first ring resonator has a first diameter and the second ring resonator has a second diameter that is equal to the first diameter.

5. The structure of claim 1 wherein the first waveguide core and the first ring resonator have a first height, the first dielectric layer has a first thickness that is greater than the first height, the second waveguide core and the second ring resonator have a second height, and the second dielectric layer has a thickness that is greater than the second height.

6. The structure of claim 1 wherein the first surface of the first dielectric layer directly contacts the second surface of the second dielectric layer.

7. The structure of claim 1 wherein the first chip includes a first splitter, a third waveguide core coupled by the first splitter to the first waveguide core, and a third ring resonator adjacent to a portion of the third waveguide core, the first splitter is configured to divert a portion of the light propagating in the first waveguide core from the first waveguide core to the third waveguide core, and the first dielectric layer is positioned over the third waveguide core and the third ring resonator.

8. The structure of claim 7 wherein the second chip includes a fourth ring resonator in a second overlapping relationship with the third ring resonator, and the third waveguide core includes a plurality of curved bends configured to laterally offset the routing of the third waveguide core relative to the first waveguide core.

9. The structure of claim 8 wherein the first ring resonator is spaced in a vertical direction from the second ring resonator, and the fourth ring resonator is spaced in the vertical direction from the third ring resonator.

10. The structure of claim 8 wherein the first chip includes a second splitter, a fourth waveguide core coupled by the second splitter to the first waveguide core, and a fifth ring resonator adjacent to a portion of the fourth waveguide core, the second splitter is configured to divert a portion of the light propagating in the first waveguide core from the first waveguide core to the fourth waveguide core, and the first dielectric layer is positioned over the fourth waveguide core and the fifth ring resonator.

11. The structure of claim 10 wherein the second chip includes a sixth ring resonator in a third overlapping relationship with the fourth ring resonator, and the fourth waveguide core includes a plurality of curved bends configured to laterally offset the routing of the fourth waveguide core relative to the first waveguide core and relative to the third waveguide core.

12. The structure of claim 8 wherein the first ring resonator has a first diameter, the second ring resonator has a second diameter equal to the first diameter, the third ring resonator has a third diameter equal to the first diameter, and the fourth ring resonator has a fourth diameter equal to the second diameter.

13. The structure of claim 1 wherein the first waveguide core and the first ring resonator comprise silicon, and the second waveguide core and the second ring resonator comprise silicon.

14. The structure of claim 1 wherein the first waveguide core and the first ring resonator comprise silicon nitride, and the second waveguide core and the second ring resonator comprise silicon nitride.

15. The structure of claim 1 wherein the first ring resonator and the second ring resonator each comprise an annular waveguide core.

16. The structure of claim 15 wherein the first ring resonator and the second ring resonator have an inner diameter in a range from 4 microns to 40 microns, the first ring resonator and the second ring resonator have an outer diameter in a range from 4 microns to 40 microns, and the outer diameter is greater than the inner diameter.

17. The structure of claim 1 wherein the first ring resonator has a first center point, and the second ring resonator has a second center point that is laterally offset from the first center point of the first ring resonator.

18. A method comprising:
    forming a first chip including a first waveguide core, a first ring resonator adjacent to a portion of the first waveguide core, a first dielectric layer over the first waveguide core and the first ring resonator, a first semiconductor substrate, and a first buried oxide layer;
    forming a second chip including a second waveguide core, a second dielectric layer over the second waveguide core, a second ring resonator in the second dielectric layer, a second semiconductor substrate, and a second buried oxide layer; and
    bonding a first surface of the first dielectric layer to a second surface of the second dielectric layer,
    wherein the first semiconductor substrate is separated from the first waveguide core and the first ring resonator by the first buried oxide layer, the second semiconductor substrate is separated from the second waveguide core and the second ring resonator by the second buried oxide layer, the second ring resonator is positioned adjacent to a portion of the second waveguide core, and the first ring resonator is positioned adjacent to the second ring resonator.

19. The method of claim 18 wherein the first waveguide core and the first ring resonator are concurrently formed when forming the first chip, and the second waveguide core and the second ring resonator are concurrently formed when forming the second chip.

20. The method of claim 18 wherein the first surface of the first dielectric layer is bonded to the second surface of the second dielectric layer after forming the first chip and the second chip.

* * * * *